(12) United States Patent
Cleanthous et al.

(10) Patent No.: US 6,975,050 B2
(45) Date of Patent: Dec. 13, 2005

(54) BRUSHLESS DC MOTOR

(75) Inventors: Aris C. Cleanthous, Baltimore, MD (US); Bhauprasad V. Gorti, Abingdon, MD (US); Michael J. Weaver, Stewartstown, PA (US); Christopher R. Yahnker, Eldersburg, MD (US); Richard T. Walter, Baldwin, MD (US)

(73) Assignee: Black & Decker Inc., Newark, DE (US)

( * ) Notice: Subject to any disclaimer, the term of this patent is extended or adjusted under 35 U.S.C. 154(b) by 1 day.

(21) Appl. No.: 10/169,638

(22) PCT Filed: Jan. 4, 2001

(86) PCT No.: PCT/US01/00357

§ 371 (c)(1),
(2), (4) Date: Oct. 17, 2002

(87) PCT Pub. No.: WO01/52384

PCT Pub. Date: Jul. 19, 2001

(65) Prior Publication Data

US 2003/0222516 A1 Dec. 4, 2003

Related U.S. Application Data

(60) Provisional application No. 60/175,133, filed on Jan. 7, 2000.

(51) Int. Cl.$^7$ .............................................. H02K 7/14
(52) U.S. Cl. ........................ 310/50; 310/261; 310/43; 310/216; 310/181; 310/152
(58) Field of Search ................................ 310/152, 184, 310/43, 50, 180, 216, 261, 45, 47, 86, 89, 259

(56) References Cited

U.S. PATENT DOCUMENTS 2,159,768 A * 5/1939 Campbell .................. 310/266

(Continued)

FOREIGN PATENT DOCUMENTS

DE 2217884 A1 10/1973

(Continued)

OTHER PUBLICATIONS

David Halliday, Fundamentals of Physics, John Wiley & Sons, Inc, Fifth Edition, pp. 793, 796–798.*

(Continued)

*Primary Examiner*—Darren Schuberg
*Assistant Examiner*—Yahveh Comas
(74) *Attorney, Agent, or Firm*—Harness, Dickey & Pierce, P.L.C.

(57) ABSTRACT

A system and method for reducing the cost of producing a brushless DC motor is presented. The brushless DC motor provides higher power density and efficiency with an increased tool run time. The brushless DC motor includes a rotor assembly that has an unmagnetized permanent magnet affixed to a shaft. The permanent magnet remains unmagnetized until the motor is partially assembled. A plurality of coils for producing a magnetic field are wound about the rotor assembly. The coils include end turns that enclose the rotor assembly such that the rotor assembly is not removable. Since the windings are wound with the rotor assembly already enclosed, the windings do not require large end coils to allow subsequent insertion of the rotor. Minimizing the end coils reduces the length of wire required per turn, thereby reducing the resistance of the winding. Also, since the permanent magnet is unmagnetized when the coils are wound around the rotor assembly the winding process is simplified by not coupling energy into the wire which would influence the winder operation. The wound assembly is inserted into a stator stack comprised of magnetic material that provides a magnetic flux return path for the magnetic flux generated by the permanent magnet. Using an unmagnetized permanent magnet facilitates easy insertion of the wound assembly into the stator stack, reduces the accumulation of magnetic debris during the manufacturing process, and permits the motor assembly to be sealed prior to magnetizing the permanent magnet.

31 Claims, 8 Drawing Sheets

U.S. PATENT DOCUMENTS

| | | | | |
|---|---|---|---|---|
| 2,328,743 | A | * 9/1943 | Roters | 310/DIG. 2 |
| 2,860,267 | A | * 11/1958 | Hayes | 310/266 |
| 4,130,769 | A | 12/1978 | Karube | |
| 4,228,384 | A | 10/1980 | Arnold et al. | |
| 4,547,713 | A | 10/1985 | Langley et al. | |
| 4,733,118 | A | * 3/1988 | Mihalko | 310/177 |
| 4,745,345 | A | 5/1988 | Petersen | |
| 4,755,699 | A | 7/1988 | Schmider | |
| 4,873,463 | A | 10/1989 | Jones | |
| 4,883,997 | A | 11/1989 | De Cesare | |
| 4,900,968 | A | 2/1990 | Feigel et al. | |
| 4,942,323 | A | 7/1990 | DeCesare | |
| 5,197,685 | A | 3/1993 | Banner | |
| 5,205,721 | A | * 4/1993 | Isaacson | 310/254 |
| 5,221,881 | A | 6/1993 | Cameron | |
| 5,382,853 | A | 1/1995 | Von Der Heide et al. | |
| 5,525,850 | A | 6/1996 | Stinson | |
| 5,572,097 | A | 11/1996 | Cameron | |
| 5,619,085 | A | * 4/1997 | Shramo | 310/184 |
| 5,689,159 | A | 11/1997 | Culp et al. | |
| 5,714,827 | A | 2/1998 | Hansson | |
| 5,715,590 | A | * 2/1998 | Fougere et al. | 29/564.1 |
| 5,729,065 | A | 3/1998 | Fremery et al. | |
| 5,731,670 | A | 3/1998 | Galbiati et al. | |
| 5,747,953 | A | * 5/1998 | Philipp | 318/139 |
| 5,798,592 | A | 8/1998 | Peterson | |
| 5,838,085 | A | * 11/1998 | Roesel et al. | 310/113 |
| 5,903,462 | A | 5/1999 | Wagner et al. | |
| 5,907,205 | A | * 5/1999 | Herman et al. | 310/152 |
| 5,909,072 | A | 6/1999 | Muller | |
| 5,912,519 | A | * 6/1999 | Horner et al. | 310/74 |
| 5,998,905 | A | * 12/1999 | Fougere et al. | 310/254 |
| 6,047,104 | A | 4/2000 | Cheng | |
| 6,051,943 | A | 4/2000 | Rabin et al. | |
| 6,064,175 | A | 5/2000 | Lee | |
| 6,080,352 | A | 6/2000 | Dunfield et al. | |
| 6,081,093 | A | 6/2000 | Oguro et al. | |
| 6,177,741 | B1 | * 1/2001 | Lutkenhaus et al. | 310/71 |
| 6,359,401 | B1 | 3/2002 | Garcia-Sinclair et al. | |
| 6,365,998 | B1 | * 4/2002 | Kech et al. | 310/194 |

FOREIGN PATENT DOCUMENTS

| | | |
|---|---|---|
| DE | 2545303 A1 | 4/1977 |
| DE | 2601981 A1 | 7/1977 |
| DE | 2548313 A1 | 2/1980 |
| DE | 3510228 A1 | 10/1986 |
| DE | 3528765 A1 | 9/1987 |
| DE | 3609351 A1 | 9/1987 |
| DE | 3331002 A1 | 2/1988 |
| DE | 3711397 A1 | 10/1988 |
| DE | 3620137 A1 | 3/1989 |
| DE | 3839932 A1 | 6/1990 |
| DE | 39 38 088 | 5/1991 |
| DE | 4026785 A1 | 5/1992 |
| DE | 4122391 A1 | 1/1993 |
| DE | 4440495 A1 | 5/1996 |
| DE | 19502907 A1 | 8/1996 |
| DE | 4432530 A1 | 6/1998 |
| EP | 0107629 A1 | 7/1986 |
| EP | 0170641 A2 | 1/1987 |
| EP | 0268490 A2 | 5/1988 |
| EP | 0254215 A1 | 7/1988 |
| EP | 0107628 A1 | 8/1988 |
| EP | 0419435 A2 | 3/1991 |
| EP | 0490375 A1 | 6/1992 |
| EP | 0688086 A1 | 12/1995 |
| EP | 08484474 A1 | 6/1998 |
| FR | 2677571 A1 | 11/1996 |
| GB | 2111773 A | 12/1984 |
| JP | 3-190586 | 8/1991 |
| JP | 9068222 A | 3/1997 |
| WO | WO 8802192 A1 | 3/1988 |
| WO | WO 9306647 A1 | 7/1993 |
| WO | WO 9638903 A1 | 12/1996 |

OTHER PUBLICATIONS

International Search Report, PCT/US01/00357, ISA/US, Feb. 28, 2001.

PCT International Search Report PCT/US01/50210, Dec. 19, 2001.

* cited by examiner

BRUSHLESS DC MOTOR

This application is a National Stage of International Application No. PCT/US 01/00357 filed Jan. 5, 2001. This application claims the benefit of U.S. Provisional Application No. 60/175,133 filed Jan. 7, 2000. U.S. Ser. No. 09/755,330 for "Brushless DC Motor" filed Jan. 5, 2001 and U.S. Ser. No. 09/742,839 for "Brushless DC Motor Sensor Control System and Method" (now U.S. Pat No. 6,538,403) filed Dec. 20, 2000 also claim the benefit of U.S. Provisional Application No. 60/175,133.

BACKGROUND AND SUMMARY OF THE INVENTION

The present invention relates generally to electrically operated power tools and in particular, to power tools that are powered by a brushless DC motor.

Over the past couple of decades the use of cordless power tools has increased dramatically. Cordless power tools provide the ease of a power assisted tool with the convenience of cordless operation. Generally, cordless tools are driven by a Permanent Magnet (PM) brushed motor that receives DC power from a battery assembly or converted AC power. The motor associated with a cordless tool has a direct impact on many of the operating characteristics of the tool, such as output torque, time duration of operation between charges and durability of the tool. The torque output relates to the capability of the power tool to operate under greater loads without stalling. The time duration of the power tool operation is strongly affected by the energy efficiency of the motor. Since, during some operating modes cordless tools are powered by battery modules that contain a limited amount of energy, the greater the energy efficiency of the motor, the longer the time duration that the tool can be operated. The durability of a power tool is affected by many factors, including the type of motor that is used to convert electrical power into mechanical power. Brushed motors such as the PM brushed motors that are generally employed in power tools are susceptible to damaged brushes during rough handling.

Conventional permanent magnet brushless DC motors provide an ineconomical alternative to brushed DC motors. Although brushless DC motors generally are more durable and provide higher speed and torque performance than similar size brushed motors, conventional brushless motors have daunting cost disadvantages. Before expanding on the cost disadvantages of brushless DC motors, first an overview of the operating characteristics of the two types of motors will be presented.

The main mechanical characteristic that separates Permanent Magnet brushless motors from Permanent Magnet brushed motors, is the method of commutation. In a PM brushed motor, commutation is achieved mechanically by means of a commutator and brush system. Whereas, in a brushless DC motor commutation is achieved electronically by controlling the flow of current to the stator windings. A brushless DC motor is comprised of a rotor for providing rotational energy and a stator for supplying a magnetic field that drives the rotor. Comprising the rotor is a shaft supported by a bearing set on each end and encircled by a permanent magnet (PM) that generates a magnetic field. The stator core mounts around the rotor maintaining an air-gap at all points except for the bearing set interface. Included in the air-gap are sets of stator windings that are typically connected in either a three-phase wye or delta configuration. Each of the windings is oriented such that it lies parallel to the rotor shaft. Power devices such as MOSFETs are connected in series with each winding to enable power to be selectively applied. When power is applied to a winding, the resulting current in the winding generates a magnetic field that couples to the rotor. The magnetic field associated with the PM in the rotor assembly attempts to align itself with the stator generated magnetic field resulting in rotational movement of the rotor. A control circuit sequentially activates the individual stator coils so that the PM attached to the rotor continuously chases the advancing magnetic field generated by the stator windings. Proper timing of the commutation sequence is maintained by monitoring sensors mounted on the rotor shaft or detecting magnetic field peaks or nulls associated with the PM.

Generally, existing brushless DC motors that provide a specified power output within a volume that is appropriate for portable power tools are too costly for the consumer market (by a factor of 10). The most significant factors driving the cost of a brushless DC motor are the power density, the cost of the permanent magnets and elecontronic components, and complex production procedures. Therefore, to reduce the cost of producing brushless DC motors either the cost of the permanent magnets must be reduced, the method of assembling the devices must be improved, or the power density must be increased. The cost of the permanent magnets can be reduced by using either smaller or less powerful permanent magnets. The power density of a brushless DC motor can be increased by using higher power PMs or reducing the resistance of the stator windings.

The present invention provides a system and method for reducing the cost of producing brushless DC motors. The brushless DC motor includes a rotor assembly that has an unmagnetized permanent magnet affixed to a shaft. The permanent magnet remains unmagnetized until the motor is partially assembled. A plurality of coils for producing a magnetic field are wound about the rotor assembly. The coils include end turns that enclose the rotor assembly such that the rotor assembly is not removable. Since the windings are wound with the rotor assembly already enclosed, the windings do not require large end coils to allow subsequent insertion of the rotor. Minimizing the end coils reduces the length of wire required per turn, thereby reducing the resistance of the winding. Also, since the PMs are unmagnetized when the coils are wound around the rotor assembly the winding process is simplified by not coupling energy into the wire which would interference with the winder operation. In addition, enclosing the rotor assembly with the coils improves the coupling between the permanent magnet and the coils, thereby permitting the use of a smaller permanent magnet. The wound assembly is inserted into a stator stack comprised of ferrous material that provides a magnetic flux return path for the magnetic flux generated by the PM and stator windings. Using an unmagnetized PM facilitates easy insertion of the wound assembly into the stator stack, reduces the accumulation of metallic debris during the manufacturing process, and permits the motor assembly to be sealed prior to magnetizing the PM.

For a more complete understanding of the invention, its objects and advantages, reference may be had to the following specification and to the accompanying drawings.

DESCRIPTION OF THE PREFERRED EMBODIMENT

Figure 1:
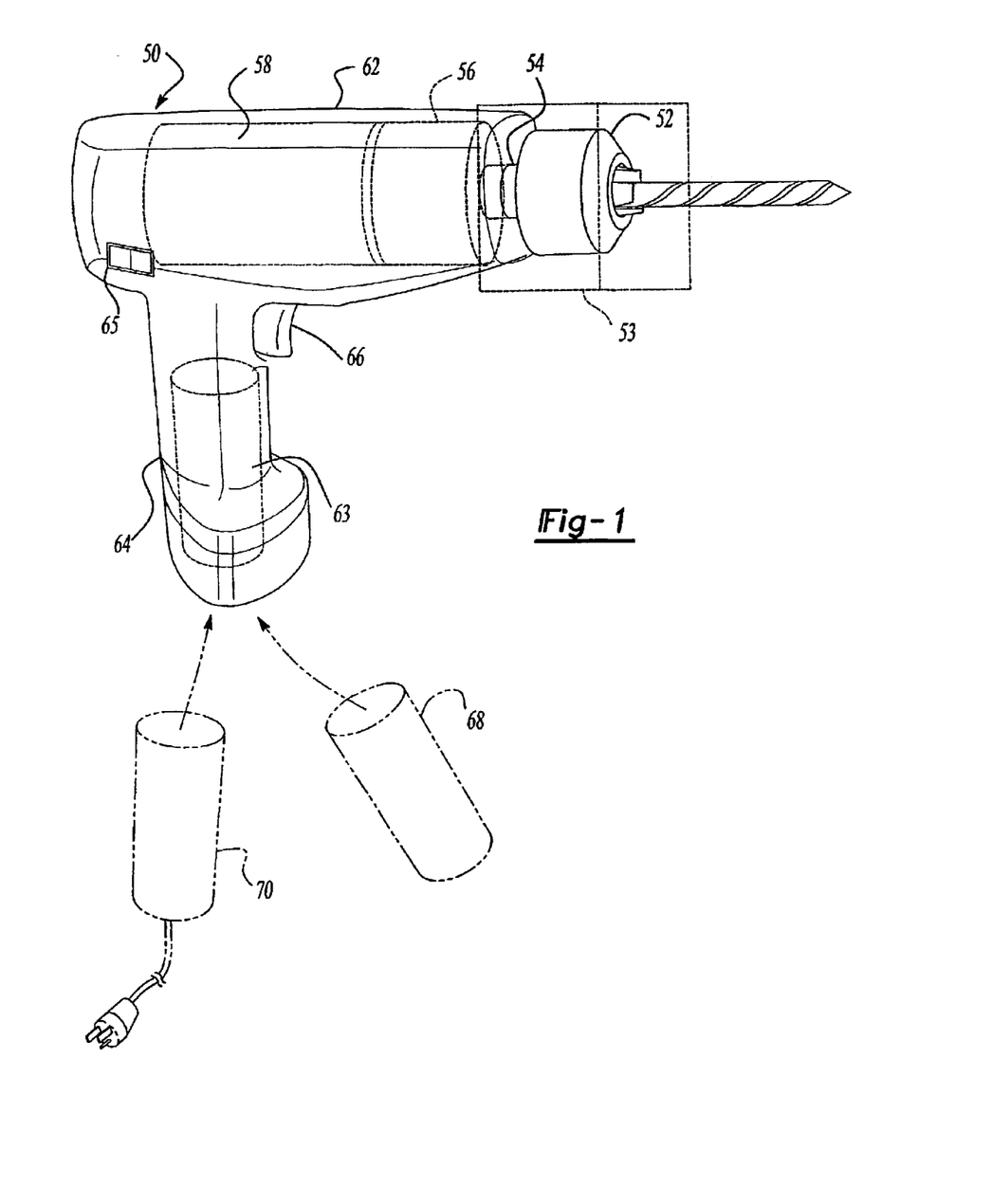
FIG. 1 is a three dimensional view showing a present embodiment of a portable power tool including a brushless DC motor in accordance with the principles of the invention.

Referring to FIG. 1, a portable power tool 50 according to the present invention is shown. While the present invention is shown and described with a power drill 50, it will be appreciated that the particular tool is merely exemplary and could be a circular saw, a reciprocating saw, or any similar portable power tool constructed in accordance with the teachings of the present invention. The power tool 50 includes a tool interface 53 which is driven through a gear train 56 by a DC brushless motor 58. The tool interface in the preferred embodiment includes a chuck 52 secured to a rotatable spindle 54. The motor 58 is mounted within a housing 62 that includes a handle 64 extending therefrom. A trigger switch 66 is mounted in the handle 64 below the motor 58. A controller 65 coupled to the trigger switch supplies drive signals to the motor 58. The controller 65 is mounted below the motor 58 within the housing 62. Alternative locations for mounting the controller 65 include within the handle 64, adjacent to the motor 58 and around the motor 58. A recess 63 is provided in the handle 64 to accept a power module (not shown). The power module is installed within the handle recess 63 to supply electrical power to the motor 58 through the controller 65 in response to actuation of the trigger switch 66. The handle 64 is configured to accept either a cordless battery power module 68 or a corded line power module 70. The battery power module 66 includes a battery assembly (not shown) that provides 18 VDC power to the motor 58. The AC converter power module 70 converts 120 VAC, 60 Hz power to regulated 18 VDC. Although in the preferred embodiment, the power modules 68 and 70 provide 18 VDC power to the motor 58, it is within the scope of the invention to provide any DC voltage that is required by the power tool 50, such as regulated 12 volts or unregulated 100 volts.

Figure 2:
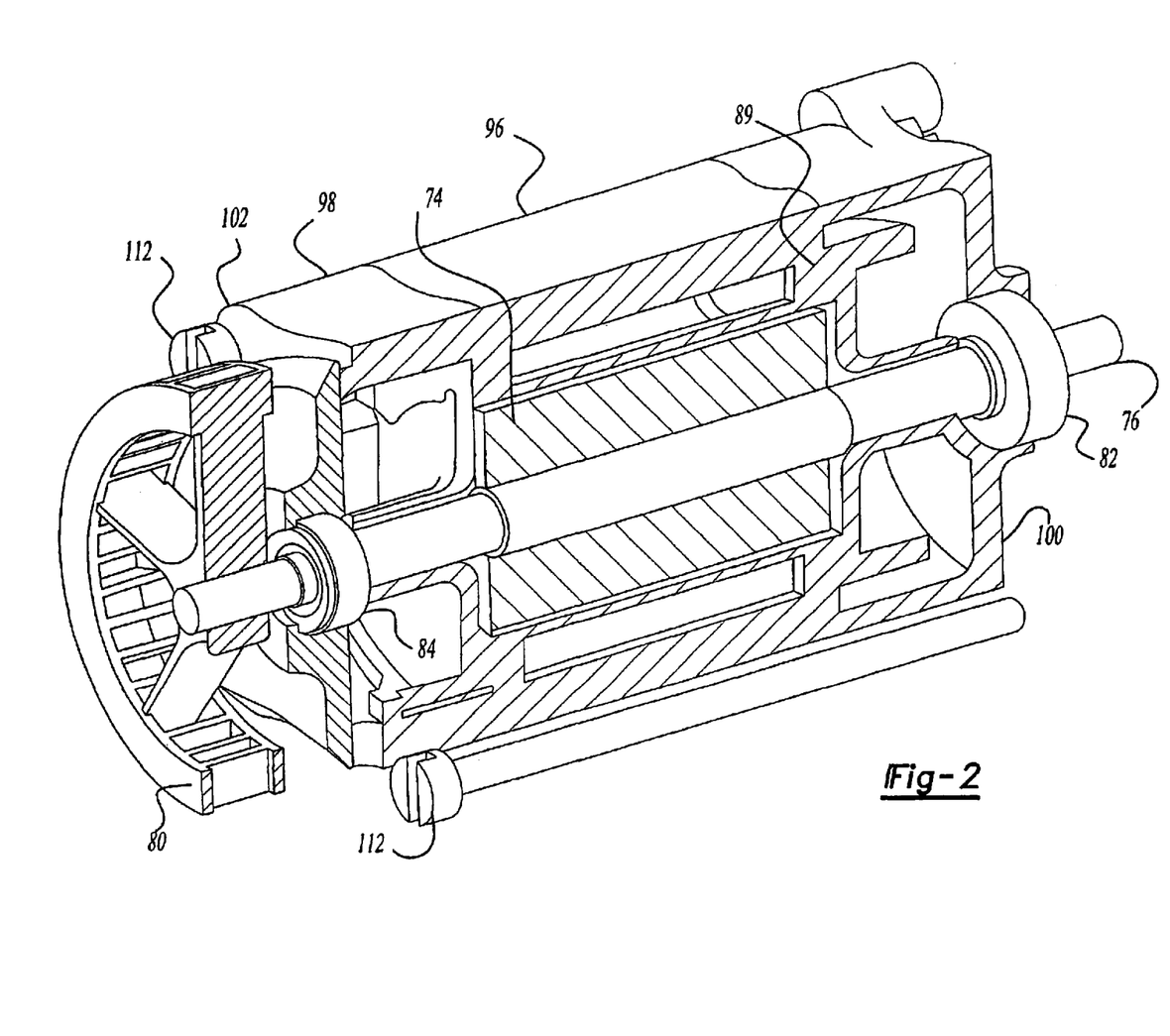
FIG. 2 is a cross-sectional view illustrating a presently preferred embodiment of a brushless DC motor in accordance with the principles of the invention.
Figure 3:
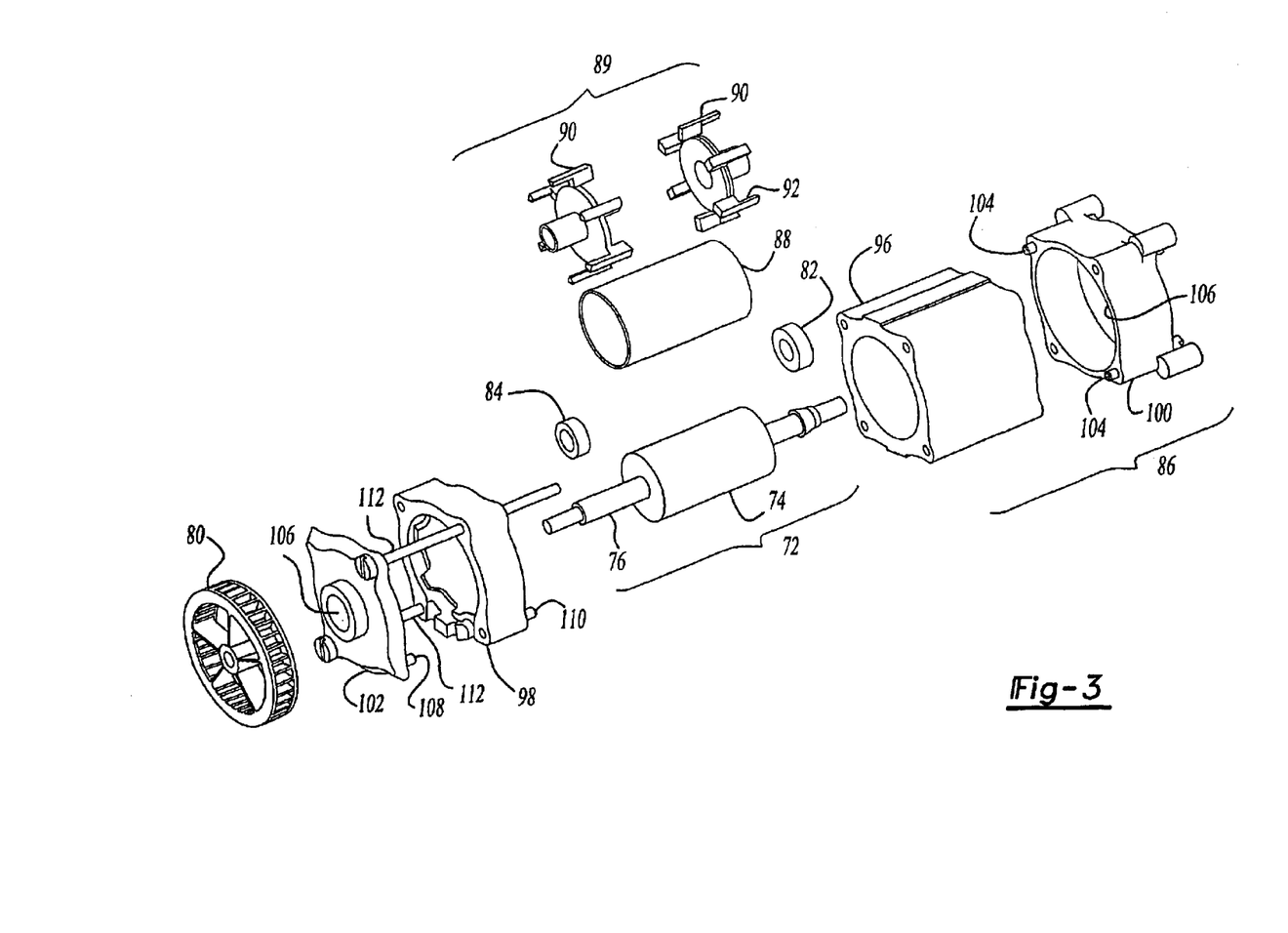
FIG. 3 is an exploded view showing a presently preferred embodiment of a brushless DC motor in accordance with the principles of the invention.

Referring to FIGS. 2 and 3, cut-away and exploded views of the DC brushless motor 58 are illustrated. The motor 58 includes a rotor assembly 72 having a magnetic field for supplying rotational energy to the chuck 52 through the gear train 56. A wound assembly 78 encloses the rotor assembly 72 providing a rotating magnetic field that the rotor assembly magnetic field is drawn towards. A stator assembly 96 provides a magnetic flux return path for the magnetic field generated by the rotor assembly 72. A pair of bearings 82 and 84 located between the rotor assembly 72 and the stator assembly provide a mechanical interface to permit rotation of the rotor assembly 72. A fan 80 attached to the rotor assembly 72 supplies cooling air to the motor 58 and the controller 65.

The rotor assembly 72 comprises a permanent magnet 74 that is bonded to a shaft 76. The shaft 76 in the preferred embodiment is made from magnetic steel although other materials such as stainless steel are within the scope of the invention. The permanent magnet 74 is a one-piece sintered Neodymium Iron Boron (NIB) magnet that is left unmagnetized until the motor 58 is partially constructed. The permanent magnet 74 is then transversely magnetized to provide a two-pole magnet. Although a two-pole NIB magnet is used in the preferred embodiment, it is within the scope of the invention to employ other permanent magnets such as axially magnetized Samarium-Cobalt magnets and Ferrite magnets having four or more poles. To form the NIB magnet, a quantity of Neodymium alloy is milled down to approximately 5 micron. A transverse field is then applied and the milled Neodymium is formed by a press made of ferrous material. Finally, the pressed material is sintered resulting in a near net shaped magnet. The final shape for the magnet is attained by machining the material. The resulting permanent magnet 74 is attached to the shaft 76. The methods of attaching the magnet 74 to the shaft include injection molding and bonding. In the injection molding version, the rotor assembly 72 is inserted into an injection mold. Plastic or epoxy that serves as a bonding agent is injected between the shaft 76 and the permanent magnet 74. The shape of the magnet 74 inside diameter is preferably elliptical while the shaft is round. There is a minimum gap of 0.5 mm per side to allow for the plastic to flow through. In the bonding version, the clearance between the shaft 76 and the magnet is smaller than that required for the injection molding version. This is to compensate for the decreasing strength of cylindrical metal part bonders with increasing gap between bonding surfaces. The rotor assembly 72 is then placed into a winding form 89 prior to winding the coils.

Figure 4A:
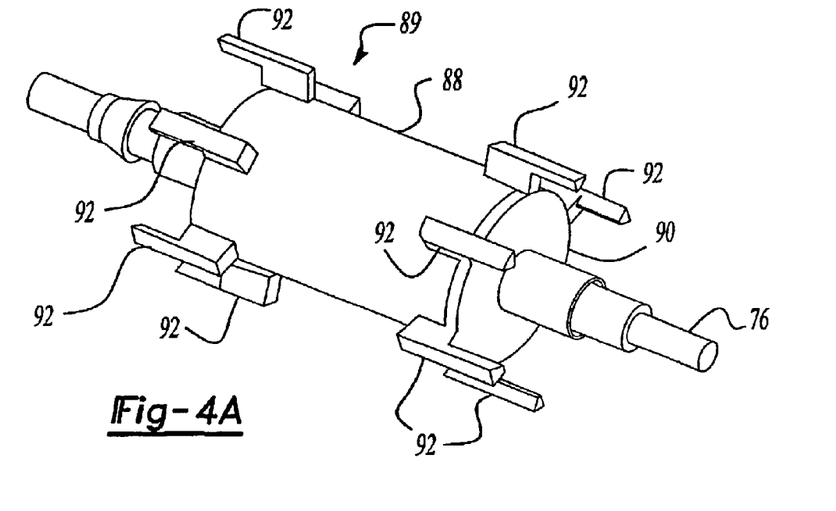
FIG. 4A, is a perspective view of the winding form enclosing the rotor assembly.

Referring to FIG. 4A, a perspective view of the winding form 89 enclosing the rotor assembly 72 is shown. The winding form 89 includes insulating tube 88 and two end plugs 90 that are formed from plastic. In addition, six plastic teeth 92 are integrated to the end plugs 90 to provide winding posts for a set of coils. Although a plastic winding form with plastic teeth is used in the preferred embodiment, the scope of the invention includes using other materials such as magnetic steel and insulated powder metal. Three sets of coils (not shown) are wound onto the winding form 89 so that the coils (not shown) lie substantially parallel to the shaft 76. The coils are constructed with multi-strand magnet wire to obtain a better fill, for ease of winding, and to reduce resistance. A quasi-tumble winding method is used for winding the coils. The winding method is a variation of layer winding that is similar to tumble winding, except for using multiple wire feeds instead of a single wire feed.

Figure 4B:
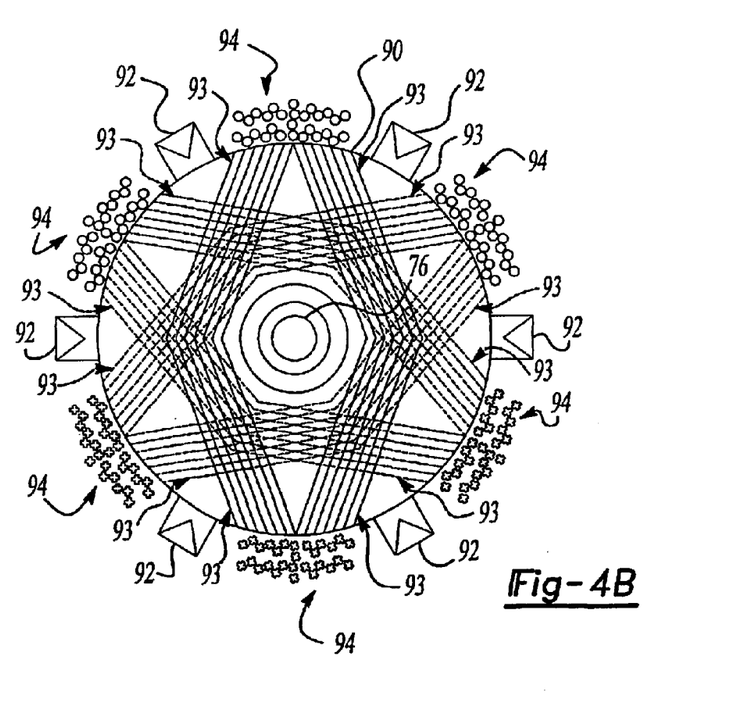
FIG. 4B is an end view of a wound assembly illustrating the arrangement of the coils.

Referring to FIG. 4B, an end view of the wound assembly 78 after winding is shown. The wound assembly 78 includes the winding form 89 enclosing the rotor assembly 72 with the coils 94 wound about the form 89. The coils 94 include end turns 93 that enclose the ends of the rotor assembly such that the rotor assembly 72 is not removable from the wound assembly. The end turns 93 are wound so that the length of wire required for each of the coils 94 is minimized. Minimizing the wire length leads to coils 94 having a lower resistance and therefore lower resistire losses. The resulting increased efficiency of the motor 58 increases the power density and reliability of the motor 58 and reduces the complexity of thermal management circuitry. As well as minimizing the wire length, the end turns 93 are arranged to minimize any gap between the end of the rotor assembly 72 and the end turns 93. Minimizing the gap provides increased coupling between the coils 94 and the permanent magnet 74. Due to the improved coupling, a smaller, less costly permanent magnet 74 can be employed for the motor 58. The preferred embodiment uses a set of three coils connected in a three-phase wye configuration. However, the scope of the invention includes other coil configurations such as two-phase bifilar wound, three-phase delta, and other multi-phase configurations.

Again referring to FIGS. 2 and 3, the stator assembly 86 includes a stator stack 96, an end ring 98, and front end bell 100. In the preferred embodiment, the stator stack is constructed from laminated silicon steel. However, the scope of the invention encompasses using other magnetic materials such as insulated powder metal. The inside of the end ring 98 contains features that mate with one of the end plugs 90 and position the winding form 89 in one of six positions. Although it is preferable that the winding form 89 be keyed in one of the six positions, it is not critical that a certain orientation be achieved. The two end bells 100 and 102 serve as a means of supporting the rotor assembly 72 and retaining it concentric to the winding form 89 while allowing the rotor assembly 72 to spin freely. In the preferred embodiment, the end bells 100 and 102 are made from aluminum, however it is within the scope of the invention to use other materials such as plastic. The forward side of the front end bell 100 is modeled to interface with the gear train 56. The other side of the front end bell 100 includes two posts 104 that mate with the stator stack 96. The front end bell posts 104 are used for location and retention of concentricity between the end bell bearing bore 106 and the stator stack 96. The back end bell 102 includes a sleeve bearing (not shown) and two posts 108 that mate with the end ring 98, which in turn has two posts 110 that interface with the stator stack 96. Two steel pins 112 are inserted through the back end bell 102, the end ring 98, and pressed into the stator stack 96. The steel pins 112 and the posts 110 ensure concentricity between the bearing bore 106 and the stator stack 96.

Figure 8:
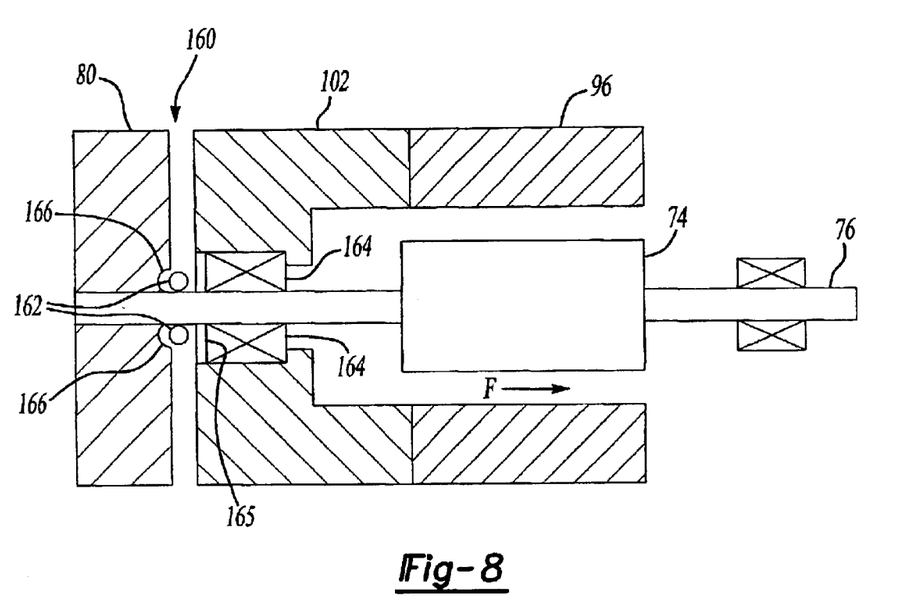
FIG. 8 is a two-dimensional view illustrating a bearing system in accordance with the teachings of the present invention.

Referring to FIG. 8, a detailed two-dimensional view of a bearing system 160 of the presently preferred embodiment of the invention is illustrated. The bearing system 160 compensates for radial and axial thrust forces existing at the interface of the stator 96 and rotor assembly 72 (see FIG. 3). The bearing system 160 includes a set of caged balls 162 bearing on the front face 165 of a sleeve bearing 164. The sleeve bearing 164 serves two functions, being used as a race for the caged balls 162 in addition to compensating for radial forces. The caged balls 162 are held against the sleeve bearing 164 by a ball race 166 formed in the back side of the fan 80. Although in the presently preferred embodiment, the ball race 166 is integrated into another assembly (the fan 80), it is within the scope of the invention to use a ball race that is not integrated into another assembly.

Figure 9:
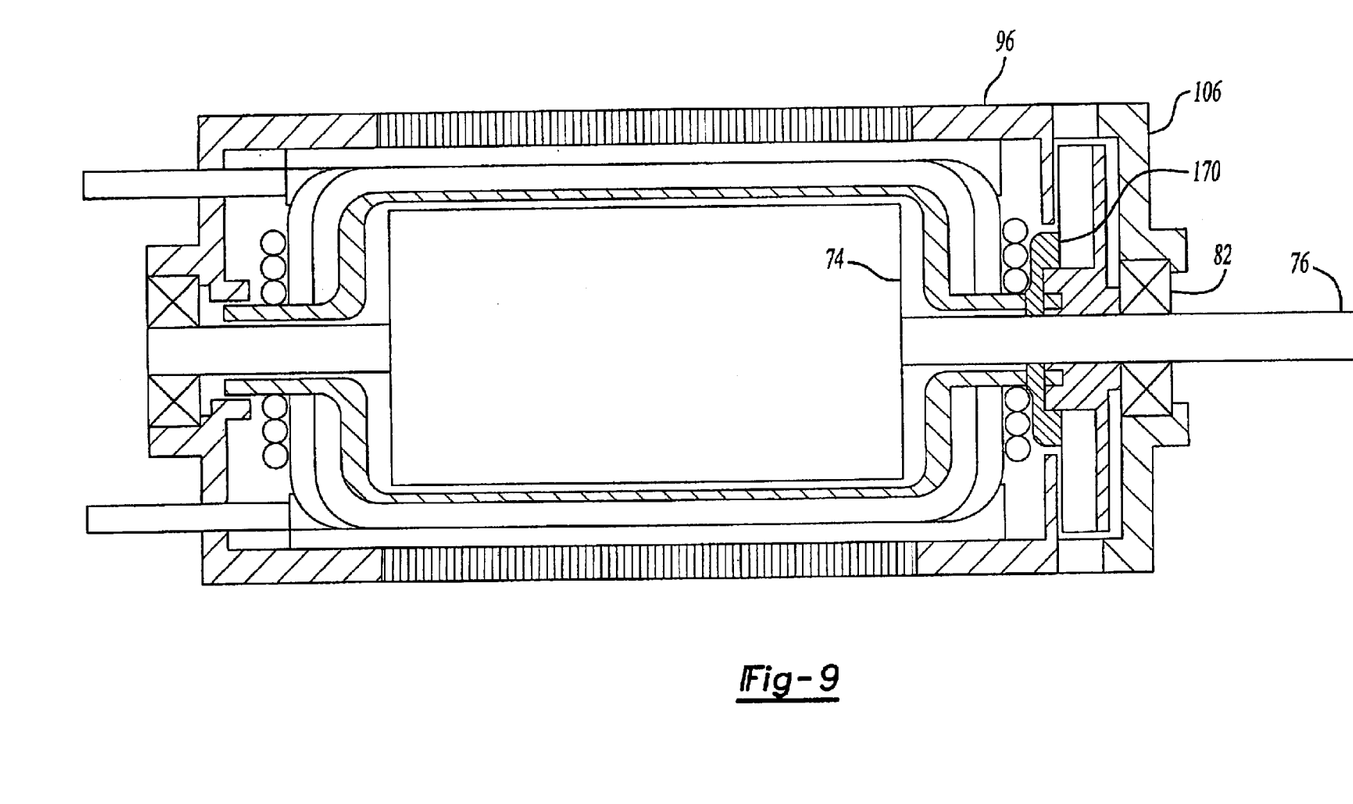
FIG. 9 is a two-dimensional view illustrating a sealing system in accordance with the teachings of the present invention.

Referring to FIG. 9, a two-dimensional view highlighting a sealing system of the presently preferred embodiment of the invention is illustrated. The sealing system prevents contamination of the region between the winding form 88 and, shaft 76, and end bell 100 during operations such as impregnating the windings with resin. A compliant seal 170 is applied from the winding form end cap 92 to the end bell 100. The seal 170 adheres to a bearing boss on the end bell 100 as well as the end cap 92. The seal 170 blocks off the interface area from outside airborne contaminants as well as contamination that might occur due to the process of impregnating the windings.

Figure 5:
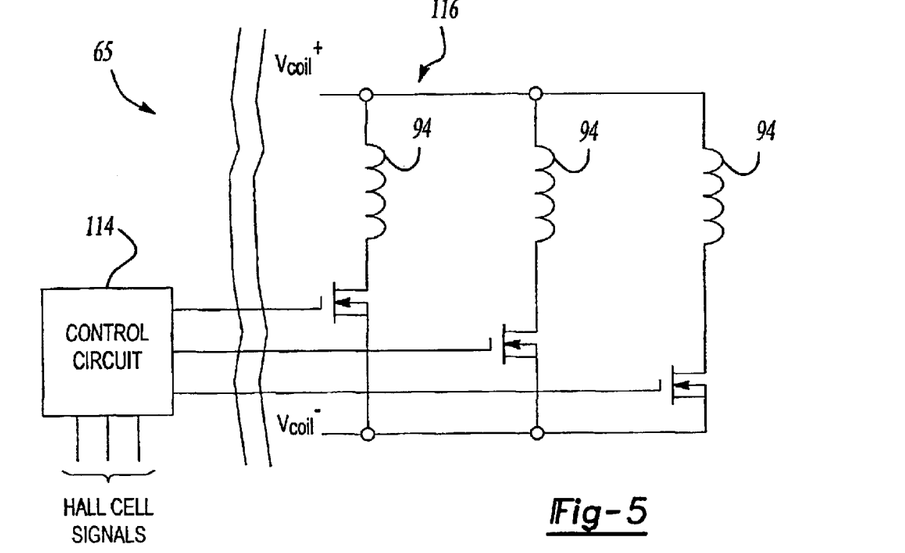
FIG. 5 is a schematic diagram showing a controller for generating drive signals for the coils.

Referring to FIG. 5, the controller 65 includes a control circuit 114, a coil driver module 116, and a heat sink. Signals from the trigger switch 66 are coupled to the control circuit 114, which generates drive signals for controlling the coil driver module 116. The output of the coil driver module 116 couples to the coils 94 providing drive power for the motor 58. The coil driver module 116 attaches to the heat sink 118, which provides a thermal path for power losses. In the preferred embodiment the controller 65 is attached to the side of the motor 58 above the handle 64, however it is within the scope of the invention to locate the controller 65 elsewhere within the power tool 50 such as behind the motor 58 in the back of the power tool 50 and within the handle 64. The controller 65 sequentially switches a DC voltage across each of the phase coils in a manner that generates a rotating magnetic field. In response, the rotor assembly 72 rotates in an attempt to align the magnetic field generated from the permanent magnet 74 with the rotating magnetic field. Controllers for brushless DC motors are well known to those skilled in the art. The scope of the invention encompasses using a controller to provide drive power for a brushless DC motor constructed in accordance with the principles of the invention.

Figure 6A:
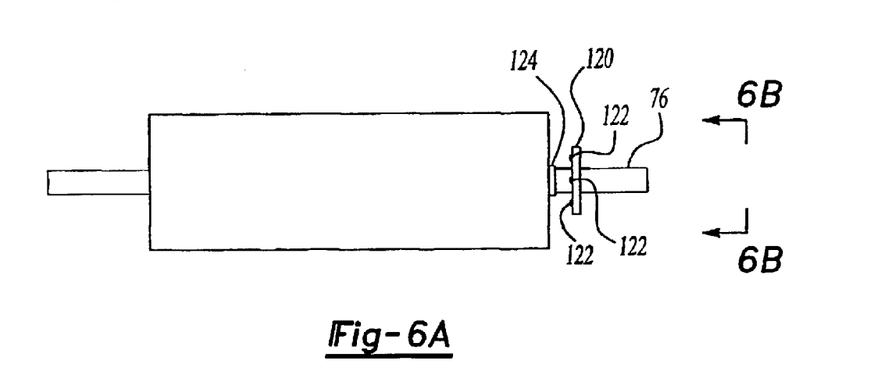
FIG. 6A is a two-dimensional view of the relationship between the sensor magnet and the sensor card.
Figure 6B:
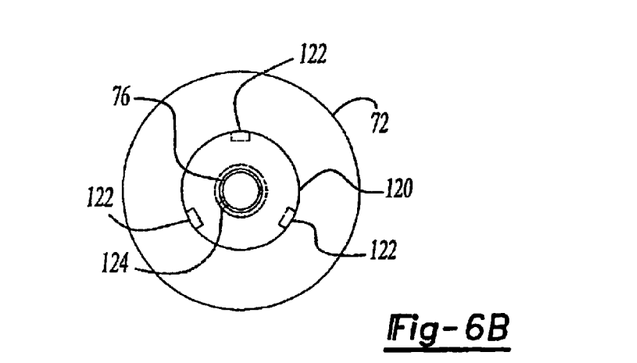
FIG. 6B is an end view of the rotor assembly and sensor card.

Referring to FIGS. 6A and 6B, the position sensor circuit is illustrated. The position sensor circuit senses the orientation of the permanent magnet 74 with respect to the coils 94. A sensor magnet 124 is mounted on the shaft 76 external to the front end bell 100 to provide a marker of the relative position of the coils 94. The sensor magnet 124 is a 2-pole ring magnet that is unmagnetized until the motor 58 is assembled, at which time an external field is applied to magnetize the sensor magnet 124 in addition to the permanent magnet 74. A sensor card 120 having three Hall sensors 122 spaced 120 degrees apart is mounted so that the Hall sensors 122 detect the sensor magnet 124 as the shaft 76 revolves. The sensor card 120 has an inner clearance hole and is mounted such that the shaft 76 passes through the card 120 and the Hall sensors 122 are maintained in close proximity to the sensor magnet 124. The outputs of the Hall sensors 122 are coupled to the controller 65 which uses the position sense in conjunction with an input from the trigger switch to determine the timing of the drive signals to the power module 116. Although the presently preferred embodiment of the invention employs three Hall sensors spaced 120 degrees apart for sensing the position of the shaft 76, it is within the scope of the invention to use other means of position sensing such as three Hall sensors spaced 60 degrees apart with an inverted center signal, sensing leakage flux, sensorless operation, and other position sensing circuits that are known to those skilled in the art.

Figure 7:
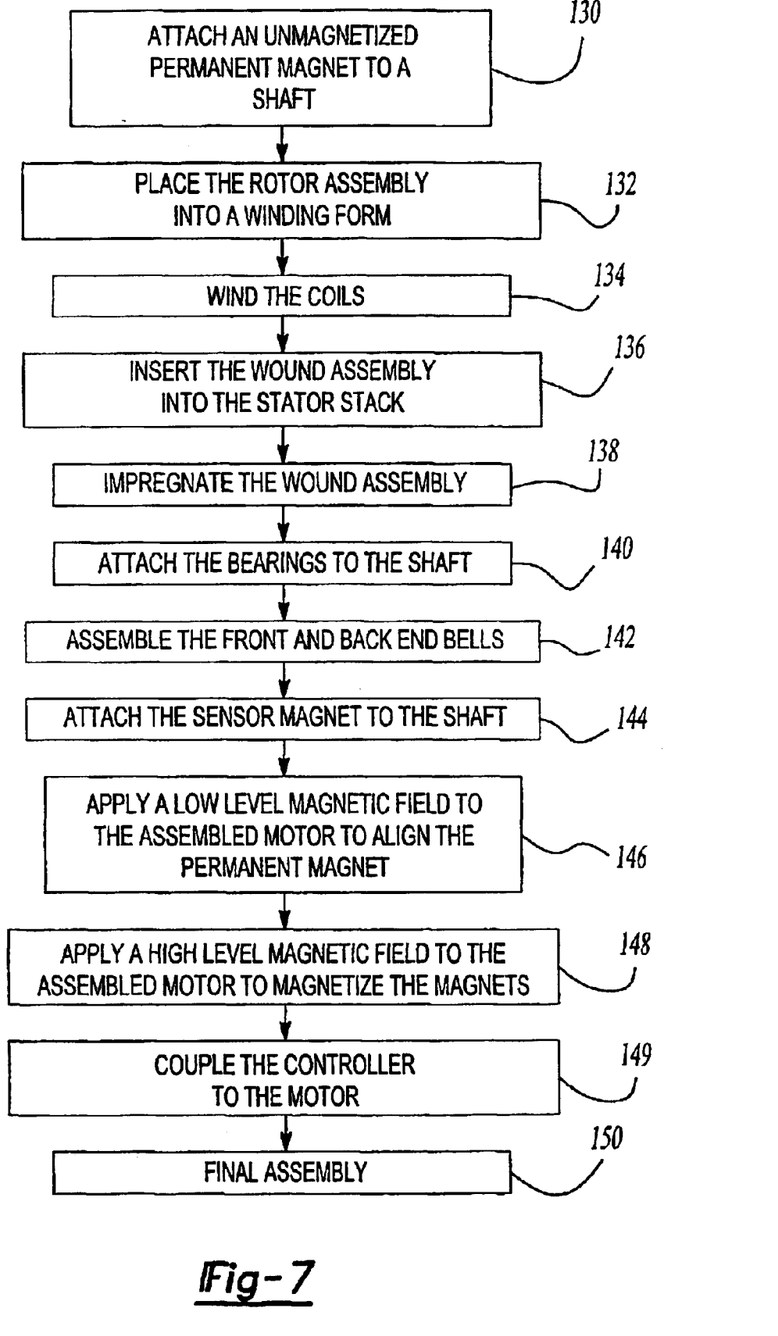
FIG. 7 is a flow diagram illustrating a process for producing a power tool in accordance with the principles of the present invention.

Referring to FIG. 7, the process of assembling the motor 58 is illustrated. At step 130, an unmagnetized permanent magnet 74 is attached to the shaft 76. The permanent magnet 74 has an elliptical center through which the shaft 76, which is round, is inserted. A Liquid Crystal Polymer (LCP) is injected between the shaft 76 and the permanent magnet 74. A minimum gap of 0.5 mm is maintained to allow for the LCP to flow through. At step 132, the rotor assembly 72 is placed into the winding form 89. A light press fit is used for retaining the end plugs 90 on the insulating tube 88 since the coils 94 will enclose the end plugs. Once assembled, the combination rotor assembly 72 and winding form 89 is placed into a winder for winding. The coils 94 are wound onto the winding form 89 using a quasi-tumble winding method that is similar to tumble winding, except for using multiple wire feeds instead of a single wire feed, step 134. Winding the coils 94 with an unmagnetized permanent magnet 74 provides for a simpler more repeatable process by eliminating the errors associated with a magnetic field from the magnet coupling into the wire as the coils 94 are wound. Without the impinging magnetic field causing eddy currents that heat the wire and Lorentz forces that deflect the wire, it is possible to wind flatter, tightly layered coils 94 that are consistent from one coil to the next. Generally, the coils for motors are wound without the permanent magnet installed to avoid the aforementioned problems with magnetic fields. To provide clearance for the later insertion of the permanent magnet inside the coils, end turns that provide clearance are generally used. In the preferred embodiment, since the coils 94 are wound with the permanent magnet 74 and rotor assembly 72 enclosed by the winding form 89, it is not necessary to provide end turns that have clearance for inserting the rotor assembly 72. Instead, the coils 94 are wound so that the wire encloses the rotor assembly 72, thereby providing shorter wire turns resulting in reduced coil resistance and lower power losses for the motor. Both conduction and eddy current losses are decreased by shortening the length of the wire turns for the coils 94. The reduced power losses result in an increased motor power density. In addition, by enclosing the rotor assembly 72 with the coils 94, the magnetic coupling from the permanent magnet 74 to the coils 94 during normal operation of the motor 58 is enhanced. After winding, the coils 94 are then interconnected in a delta configuration. At step 136, the wound assembly 78 is inserted into the stator stack 96 which is pre-fitted with the end ring 98. The wound assembly 78 is subsequently impregnated, step 138. A compliant seal is applied to the bearing boss on the end bells 100 and 102 and to the neck of the end plugs 90. The seal blocks off the interface area from any type of contamination. The coils are then heated and the resin is applied to the winding end coils. When the impregnation resin is fully cured, it forms a solid mass that holds the coils 94 in place, not allowing the wires to abrade due to vibration. The solid mass provides an improved thermal path from the coils 94 to the stator stack 96. The seal also provides a barrier that protects the winding area from outside airborne contaminants. The inside of the end ring 98 contains female features that accept the teeth 92 of the end plugs 90 and position the wound assembly 68 in one of six positions. A particular orientation is not required, however the wound assembly 78 is preferably keyed in one of the six positions. The easy insertion of the wound assembly 78 into the stator stack 96 is facilitated by the unmagnetized permanent magnet 74 which is not magnetically attracted to the stator stack 96 like conventional brushless DC motors are typically. At step 140, the bearings 82 and 84 are attached to the shaft 76. Debris is removed from within the partially assembled motor prior to attaching the end bells 100 and 102. Removal of debris is also facilitated by the unmagnetized permanent magnet 74, which does not provide a magnetic force attracting metallic and magnetic debris, which would thereby prevent removal of the debris. The front and back end bells 100 and 102 are then attached, step 142. The end bells 100 and 102 serve as a means of supporting and retaining the rotor assembly 72 concentric to the winding form 89 while allowing the rotor assembly 72 to spin freely. The end bells 100 and 102 also provide a sealed air-gap construction. By sealing the motor 58 prior to magnetizing the permanent magnet 74, debris is prevented from contaminating the cleaned assembly. At step 144, the sensor magnet 124 is attached to the shaft 76. A low-level magnetic field is then applied to the assembled motor to align the permanent magnet 74, step 146. The rotor assembly 72 rotates to orient the assembly so that the permanent magnet 74 is aligned with the external field. At step 148, a high-level magnetic field is then applied to the assembled motor 58 to transversely magnetize the permanent magnet 74 and the sensor magnet 124. At step 149, a potting boat (not shown) that contains the sensor card 120 is slid over the shaft 76 and secured to the back end bell 100. Tabs on the potting boat assembly that interface with the back end bell 100 set the hall cells in the proper position relative to the sense magnet. Next, the controller 65 is bolted to the side of the motor 58. The phase leads from the motor are attached to the controller 65 using either ultrasonic welding or Fast-on terminals. A ribbon cable for coupling the hall sensor signals to the controller 65 is then attached to the sensor card. At step 150, the final assembly steps such as insertion into the power tool 50 are completed and the finished power tool 50 is ready for operation.

From the foregoing it will be understood that the invention provides a novel brushless DC motor. The brushless DC motor includes a permanent magnet that is unmagnetized during assembly of the motor resulting in simplified assembly procedures that reduce the cost of the motor. In addition, the DC motor has improved power efficiency resulting from lower resistance coils that enclose the rotor assembly. Also, the motor is less susceptible to contamination by metallic and magnetic debris leading to improved reliability. Additionally, improved coupling from the coils to the permanent magnet permit the use of smaller, less costly permanent magnets. In addition, the reduced power losses permit the use of simpler cooling techniques for the motor. Additionally, the brushless DC motor can be employed in a portable power tool to provide faster operating speed and higher torque due to the higher power density of the brushless DC motor. The power tool reliability is improved by eliminating the brushes associated with brushed DC motors and employing the higher reliability brushless DC motor.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A cordless power tool, comprising;
    a power module for supplying electrical energy to the brushless DC motor;
    a brushless DC motor for converting electrical energy to mechanical energy, including;
        a rotor assembly having a rotatable shaft and a permanent magnet affixed to the shaft, said permanent magnet for generating a magnetic field;
        a winding form enclosing the rotor assembly;
        a plurality of coils wound upon the winding form for producing a magnetic field for applying a torque to the rotor assembly, said coils including end turns that enclose the rotor assembly such that the rotor assembly is not removable, said end turns arranged to minimize any gap between respective ends of the rotor assembly and the end turns adjacent the respective ends of the rotor assembly, wherein said coils are connected in a three phase delta configuration;

a stator stack made of a stator magnetic material for providing a magnetic flux return path for the permanent magnet magnetic field;

a position sensor system for sensing the positional relationship between the permanent magnet and the plurality of coils; and a controller, responsive to said position sensor, for controlling the supply of power to the brushless DC motor; and a tool interface for interfacing the DC motor with a tool; and a housing for enclosing the power module, controller and DC motor.

2. The cordless power tool of claim 1 further comprising a gear train coupled from the DC motor to the tool interface.

3. The cordless power tool of claim 1 wherein the DC motor further comprising a winding form being configured to receive the plurality of coils.

4. The cordless power tool of claim 3 wherein the winding form further includes a tube, a plurality of teeth, and an end plug.

5. The cordless power tool of claim 4 wherein the tube, end plug and the teeth are made from a molded plastic.

6. The cordless power tool of claim 1 wherein the coils are wound in a three phase winding configuration selected from the group of: delta configuration and wye configuration.

7. The cordless power tool of claim 6 wherein the coils are connected in the delta configuration.

8. The cordless power tool of claim 1 wherein the coils are layer wound.

9. The cordless power tool of claim 1 wherein the stator magnetic material is a laminated steel.

10. The cordless power tool of claim 1 further comprising a position sensor selected from the group comprised of: Hall effect sensors and leakage flux sensors.

11. A method of constructing a brushless DC motor, comprising the steps of:

providing magnetizable material to be used in the formation of a permanent magnet;

bonding the magnetizable material to a rotatable shaft, whereby a rotor is assembled;

winding a plurality of coils about the rotor such that an air gap is maintained between the coils and the rotor;

providing a magnetic flux return path for magnetic flux that flows from the rotor; and magnetizing the magnetizable material after winding the plurality of coils to form a permanent magnet.

12. The method of claim 11 wherein the coils include end turns that enclose the rotor such that the rotor is not removable.

13. The method of claim 11 further comprising the step of connecting the coils in a three phase delta configuration, whereby the coils have a positional relationship with the magnetizable material.

14. The method of claim 11 wherein the step of winding further comprises the steps of:

providing a winding form that encircles the rotor; and winding the plurality of coils about the winding form.

15. A DC power tool comprising:

a housing defining an interface for mechanically and electrically mating with a power module;

a brushless DC motor operable in a preselected voltage range to convert electrical power to mechanical power, the brushless DC motor comprising:

a rotor assembly including a rotatable shaft and a permanent magnet affixed to the shaft;

a slotless wound stator including a winding form that encircles the rotor assembly such that an air gap is maintained between the winding form and the rotor assembly, and a plurality of coils for producing a magnetic field for applying a torque to the rotor assembly, said coils being wound about an outer surface of the winding form;

the stator further including a hollow stator stack made of a stator magnetic material for providing a magnetic flux return path and first and second end bells secured to opposed axial ends of the stator stack, the winding form received within the stator stack, the first and second end bells rotatably supporting the rotor assembly concentric with said winding form; and a power supply module mechanically and electrically configured to connect to a source of electric power and to mate with the low-voltage DC power tool, said power supply module being adapted to provide a DC voltage in the preselected voltage range suitable for powering the low-voltage DC power tool.

16. The DC power tool of claim 15 wherein the power supply module is a cordless battery power module mechanically and electrically configured to mate with the DC power tool and to contain a battery assembly having a DC voltage in the preselected voltage range suitable for powering the DC power tool, said battery power module to provide power from the battery assembly to the DC power tool.

17. The DC power tool of claim 15 wherein the power supply module is a corded line power module mechanically and electrically configured to mate with the DC power tool and being adapted to convert electric power from the source of electric power to a DC voltage in the preselected voltage range suitable for powering the low-voltage DC power tool.

18. The DC power tool of claim 15 wherein the coils include end turns that enclose the rotor assembly such that the rotor assembly is not removable.

19. The DC power tool of claim 18 wherein the winding form further includes a tube, a plurality of teeth, and an end plug.

20. The DC power tool of claim 19 wherein the tube, end plug, and teeth are made from a molded plastic.

21. The DC power tool of claim 15 wherein the coils are wound in a three phase winding configuration selected from the group of: delta configuration and wye configuration.

22. The DC power tool of claim 21 wherein the coils are connected in the delta configuration.

23. The DC power tool of claim 21 wherein the coils are layer wound.

24. The DC power tool of claim 15 further comprising a controller for controlling the application of electrical power to the brushless DC motor.

25. A method of constructing a brushless DC motors, comprising the steps of:

bonding a permanent magnet to a rotatable shaft, whereby a rotor is assembled;

winding a plurality of coils about the rotor such that an interface is defined having an air gap formed between the coils and the rotor;

retaining the rotor substantially concentric to the plurality of coils such that the air gap is maintained;

applying a seal to the interface such that the air gap is sealed; and applying an impregnation resin to the coils after the air gap is sealed, wherein an encapsulated stator is formed.

26. The method of claim 25 further comprising the step of encircling the coils and rotor with a magnetic flux return path for magnetic flux that flows from the rotor.

27. The method of claim 26 wherein the magnetic flux return path is a stator stack.

28. The method of claim 25 further comprising the step of connecting the coils in a three phase delta configuration, whereby the coils have a positional relationship with the permanent magnet.

29. The method of claim 28 further comprising the steps of:

providing a flow of power to the windings such that a magnetic field is generated;

sensing the positional relationship between the permanent magnet and the plurality of coils; and controlling the flow of power to the windings in response to the sensed positional relationship.

30. The method of claim 25 wherein the step of winding further comprises the steps of:

providing a winding form that encircles the rotor; and winding the plurality of coils about the winding form.

31. The method of claim 30 wherein the step of winding the plurality of coils about the winding form includes winding the plurality of coils to minimize the air gap between end turns of the coils and ends of the rotor adjacent the end turns.

* * * * *

UNITED STATES PATENT AND TRADEMARK OFFICE
CERTIFICATE OF CORRECTION

PATENT NO. : 6,975,050B2
APPLICATION NO. : 10/169638
DATED : December 13, 2005
INVENTOR(S) : Aris C. Cleanthous et al

It is certified that error appears in the above-identified patent and that said Letters Patent is hereby corrected as shown below:

Title Page,
Item [75] Inventors, "Bhauprasad" should be --Bhanuprasad--.

Column 10,
Line 51, "motors" should be --motor--.

Signed and Sealed this

Twenty-fifth Day of July, 2006

JON W. DUDAS
*Director of the United States Patent and Trademark Office*